(12) United States Patent
Chen et al.

(10) Patent No.: US 11,466,708 B2
(45) Date of Patent: Oct. 11, 2022

(54) AUTOMATIC WATER HANDLING DEVICE OF AIR COMPRESSOR

(71) Applicants: Yan-Yuh Chen, Xinfeng Township, Hsinchu County (TW); Tzong-You Chen, Xinfeng Township, Hsinchu County (TW); Huey-Jen Chen, Pinghe (TW)

(72) Inventors: Yan-Yuh Chen, Xinfeng Township, Hsinchu County (TW); Tzong-You Chen, Xinfeng Township, Hsinchu County (TW); Huey-Jen Chen, Pinghe (TW)

(*) Notice: Subject to any disclaimer, the term of this patent is extended or adjusted under 35 U.S.C. 154(b) by 384 days.

(21) Appl. No.: 16/857,188

(22) Filed: Apr. 24, 2020

(65) Prior Publication Data

US 2021/0332837 A1 Oct. 28, 2021

(51) Int. Cl.
*B01D 53/26* (2006.01)
*F15B 21/048* (2019.01)
*F15B 21/00* (2006.01)
*F04B 53/04* (2006.01)

(52) U.S. Cl.
CPC .......... *F15B 21/048* (2013.01); *F15B 21/005* (2013.01); *B01D 53/261* (2013.01); *B01D 2257/80* (2013.01); *F04B 53/04* (2013.01)

(58) Field of Classification Search
CPC .. B01D 53/261; B01D 53/04; B01D 2257/80; F04B 39/08; F04B 39/16; F04B 41/02; F04B 53/04; F15B 21/005; F15B 21/048

USPC .................. 96/147; 95/117; 34/80, 472, 473
See application file for complete search history.

(56) References Cited

U.S. PATENT DOCUMENTS

| | | | | |
|---|---|---|---|---|
| 3,472,000 A | * | 10/1969 | Bridigum | B01D 53/26 96/144 |
| 4,052,178 A | * | 10/1977 | Frantz | B01D 50/00 55/432 |
| 5,427,609 A | * | 6/1995 | Zoglman | B60T 17/004 95/122 |
| 6,094,836 A | * | 8/2000 | Mahoney | B01D 53/261 34/80 |
| 2008/0257154 A1 | * | 10/2008 | Wright | B01D 53/22 96/4 |

* cited by examiner

*Primary Examiner* — Frank M Lawrence, Jr.
(74) *Attorney, Agent, or Firm* — Leong C. Lei

(57) ABSTRACT

An automatic water handling device of an air compressor includes a barrel and a pneumatic cylinder. The barrel has an interior space in which a division board formed with through holes is mounted to define a first chamber in which a desiccant agent is disposed and a second chamber. The barrel has a gas outlet opening connected with a gas accumulation tank. The second chamber has a gas inlet opening to receive compressed air. An electromagnetic valve is in connection with the second chamber and is connected to a timer for activation at predetermined time points by the timer to drive the pneumatic cylinder to open a control valve to drain off water removed from compressed air.

4 Claims, 5 Drawing Sheets

AUTOMATIC WATER HANDLING DEVICE OF AIR COMPRESSOR

TECHNICAL FIELD OF THE INVENTION

The present invention relates to an automatic water handling device of an air compressor, and more particularly to an automatic water handling device that automatically drains off water contained in air inside an air compressor at a predetermined time in order to effectively prevent water from causing direct or indirect damages to vehicle brakes and pneumatic devices.

DESCRIPTION OF THE PRIOR ART

Large-sized automobiles generally include various pneumatically operated devices, such as brakes and horns, which often uses compressed air generated by an air compressor. However, air carries, more or less, moisture. Hydrogen and oxygen contained in air would undergo chemical reaction when compressed by an air compressor to have the volume of air reduced, and consequently, an amount of water is generated. During the course of compression and accumulation of air with an air compressor, it is common to generate condensed water. For atmosphere having a high relative humidity, air carries a large amount of moisture and condensation of water would occur once air of a unit area is subjected to temperature fluctuation or rising of pressure. Such condensed water would cause direct or indirect damage to brakes, horns, or other pneumatic devices. Thus, air compressors are commonly provided with a water drainer to drain off the condensed water.

For the conventional water drainers used with air compressors, one of the simplest ways is a manual operation drain valve. Although an installation cost is low, manual operation is required in each time of draining water. This is tedious and is also effort consuming and time consuming. And, this arrangement may be just in vain if operations are not timely carried out. Alternatively, automatic electronic water drainers are also available, which involve a water level sensor element operable to perform detection of which the result is used in combination with an electromagnetic valve for opening/closing a switch. Such electronic structures may alleviate the drawbacks of manual operation; however, electronic parts involved are inevitably placed in a condition of being easy to contact water and humidity, and this would readily result in malfunctioning or even damage o the electronic parts. In addition, the automatic water drainers are generally expensive.

In view of the above, Taiwan Utility Model M582994 provides a water handling device of an air compressor, in which a barrel that includes a first chamber and a second chamber and is provided with a desiccant is provided and a pneumatic cylinder is connected to the barrel so that compressed air is allowed to discharge water contained therein to the outside and is subjected to filtration to enter an accumulation tank to prevent water from causing direct or indirect damage to vehicle brakes and pneumatic devices. Although it is possible to achieve the purpose of handling water, further improvements are desired to provide an automatic water handling device of an air compressor to enhance the utilization of devices for water handling.

SUMMARY OF THE INVENTION

The primary objective of the present invention is to provide an automatic water handling device of an air compressor that is operable to automatically drain off water contained in air inside the air compressor at a predetermined time in order to effectively prevent water from causing direct or indirect damages to vehicle brakes and pneumatic devices and thus enhancing the utilization of devices for water handling.

The present invention provides an automatic water handling device of an air compressor, which comprises a barrel and a pneumatic cylinder. The barrel has an interior space in which a division board formed with a plurality of through holes is mounted to define a first chamber and a second chamber, wherein the first chamber receives a desiccant agent disposed therein, and also has a top side that is provided with a gas outlet opening for connection with a gas accumulation tank. The second chamber is provided with a gas inlet opening for connection with an air discharge terminal of an air compressor. An electromagnetic valve is in connection with the second chamber. the electromagnetic valve is connected to a timer. The pneumatic cylinder is provided with a gas inlet opening connected with the electromagnetic valve. The second chamber is provided at a bottom side with a control valve that is connected through a connection rod to the pneumatic cylinder. The timer is operable to provide settings of time to activate the electromagnetic valve at predetermined time intervals or at predetermined time points for driving the pneumatic cylinder to open the control valve so as to allow a major portion of water contained in compressed air to drain off through the control valve, while a minor portion of the water passes through the desiccant agent to enter the gas accumulation tank, thereby effectively protecting vehicle brakes and pneumatic tools and devices from direct and indirect damage caused by moisture and water contained in compressed air.

The automatic water handling device of the air compressor as described above is arranged such that the timer is connected the electromagnetic valve and is provided with setting knobs for setting different time points for activation and deactivation of the electromagnetic valve at the time points so set.

The automatic water handling device of the air compressor as described above is arranged such that a spring is arranged between the connection rod and the barrel and the spring provides a spring force for helping returning of the connection rod and this assisting restoration and positioning of the pneumatic cylinder and the control valve.

The automatic water handling device of the air compressor as described above is arranged such that the pneumatic cylinder is provided with two support members, and the two support members are mounted to the barrel so as to fix the pneumatic cylinder to the barrel.

DETAILED DESCRIPTION OF THE PREFERRED EMBODIMENT

Figure 1:
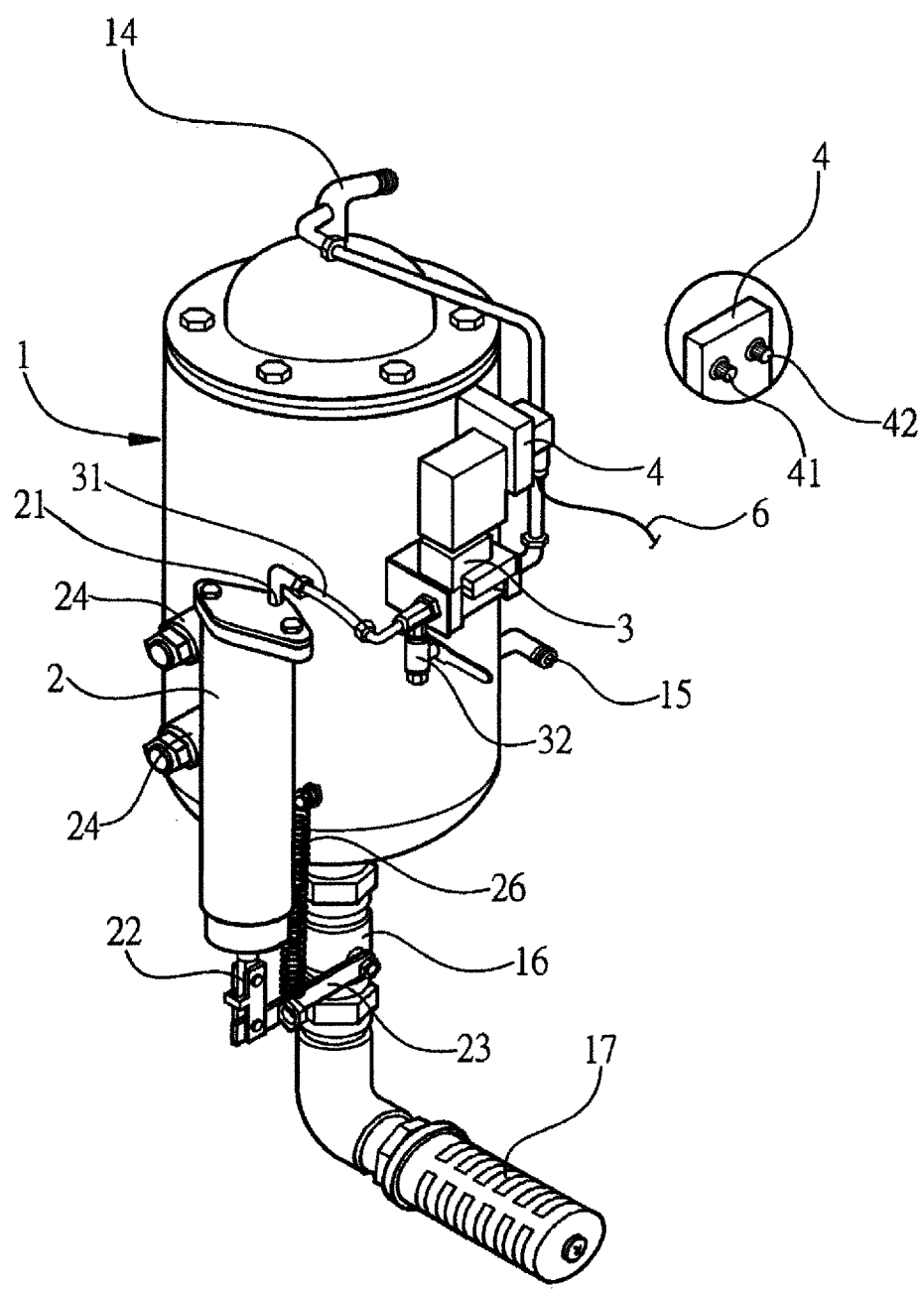
FIG. 1 is a perspective view of the present invention.
Figure 2:
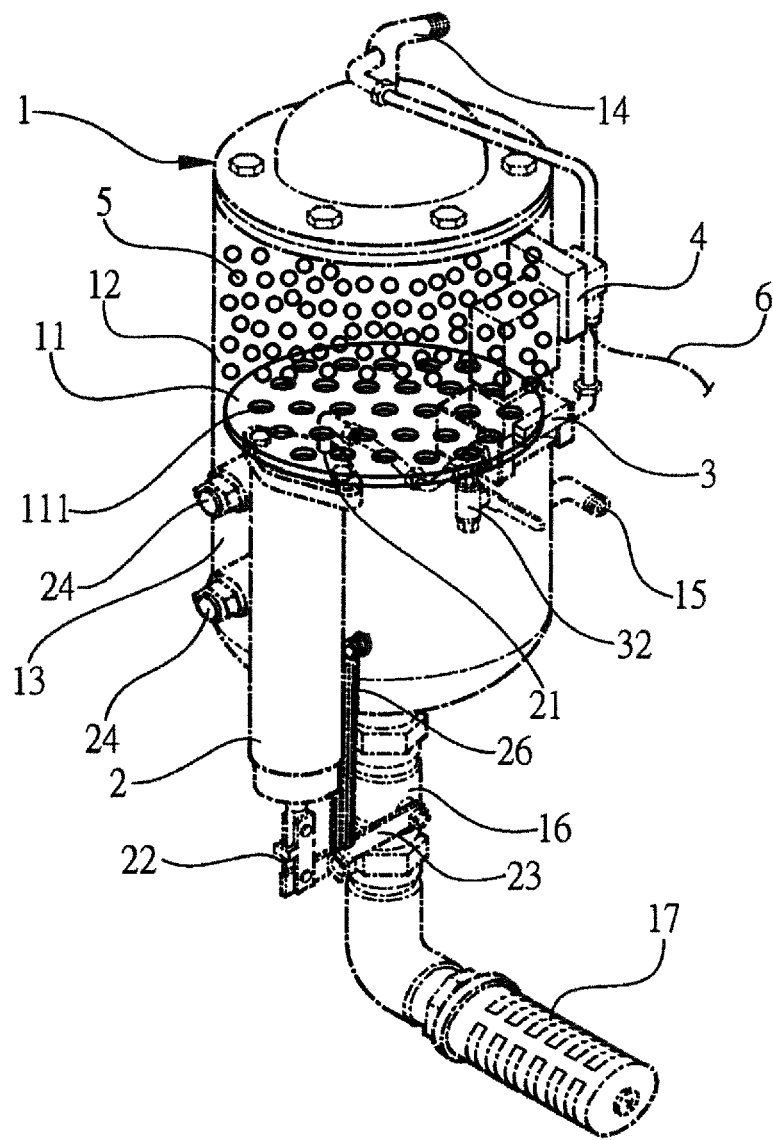
FIG. 2 is a schematic view showing an inside structure of the present invention.

Referring collectively to FIGS. 1 and 2, which are respectively a perspective view of the present invention and a schematic view showing an inside structure of the present invention, as shown in the drawings, the present invention comprises a barrel 1 and a pneumatic cylinder 2 and also comprises an electromagnetic valve 3 and a timer 4. The barrel 1 has an interior space in which a division board 11 is mounted. The division board 11 is formed with a plurality of through holes 111. The division board 11 divides the interior space of the barrel 1 into a first chamber 12 and a second chamber 13.

The barrel 1 is provided, in the first chamber 12 thereof, with a proper amount of desiccant agent 5, and the barrel 1 is provided, on a top end thereof, with a gas outlet opening 14, which is set in communication with the first chamber 12, for connection with a gas accumulation tank.

The barrel 1 is provided, on a lateral side, with a gas inlet opening 15, and the gas inlet opening 15 is in communication with the second chamber 13 for connection with an air discharge terminal of an air compressor. The barrel 1 is provided, on a bottom side, thereof with a control valve 16 that is in connection with the second chamber 13. In the instant embodiment, the control valve 16 has an outlet that is provided with a silencer 17.

The pneumatic cylinder 2 is arranged at one side of the barrel 1 that is opposite to the gas inlet opening 15 and has a top end that is formed with a gas inlet opening 21 and a bottom end that is provided with a piston rod 22. The piston rod 22 is connected by a connection rod 23 to the control valve 16 that is arranged on the bottom side of the barrel 1. In the instant embodiment, the pneumatic cylinder 2 is provided with two support members 24 that are respectively arranged at a high position and a low position and is coupled, by means of the two support members 24, to the barrel 1, so as to fixedly mount the pneumatic cylinder 2 to the barrel 1. A spring 26 is arranged between the connection rod 23 and the barrel 1 and the spring 26 provides a spring force that assists returning of the connection rod 23 so as to assist restoration of the pneumatic cylinder 2 and the control valve 16 to a home position.

The electromagnetic valve 3 is arranged at one side of the barrel 1 and is in connection with the second chamber 13 and is connected by a tube 31 to the gas inlet opening 21 at the top end of the pneumatic cylinder 2. The tube 31 is provided with a relief valve 32. In the instant embodiment, the electromagnetic valve 3 is connected through a conductor wire 6 to a power supply source (such as a vehicle power source of a large-sized automobile).

The timer 4 is connected to the electromagnetic valve 3 and includes setting knobs 41, 42 for selectively setting different time points in order to control activation and deactivation of the electromagnetic valve 3 at the different time points so set. In the instant embodiment, the timer 4 is connected by a conductor wire 6 to a power supply source (such as a vehicle power source of a large-sized automobile).

Through a combination of the previously described components, an automatic water handling device of the air compressor is provided. At the time points set by the timer 4, with the air compressor being in operation for compressing air, the electromagnetic valve 3 is operable to activate and deactivate the electromagnetic valve 3 at the set time points, and air pressure drives the pneumatic cylinder 2 to open the control valve 16 to allow a major portion of the water contained in compressed air to drain off, while a minor portion of the water moves from the second chamber 13 through the division board 11 into the first chamber 12 and is subjected to filtration by the desiccant agent 5 to then enter the gas accumulation tank and compressed air may thus be supplied for use by vehicle brakes and pneumatic tools or devices. As such, the vehicle brakes and the pneumatic tools and devices are protected against direct or indirect damage caused by such water. In case of an excessive pressure occurs during the above operation, the relief valve 32 provides an operation for properly relieving the pressure.

Figure 3:
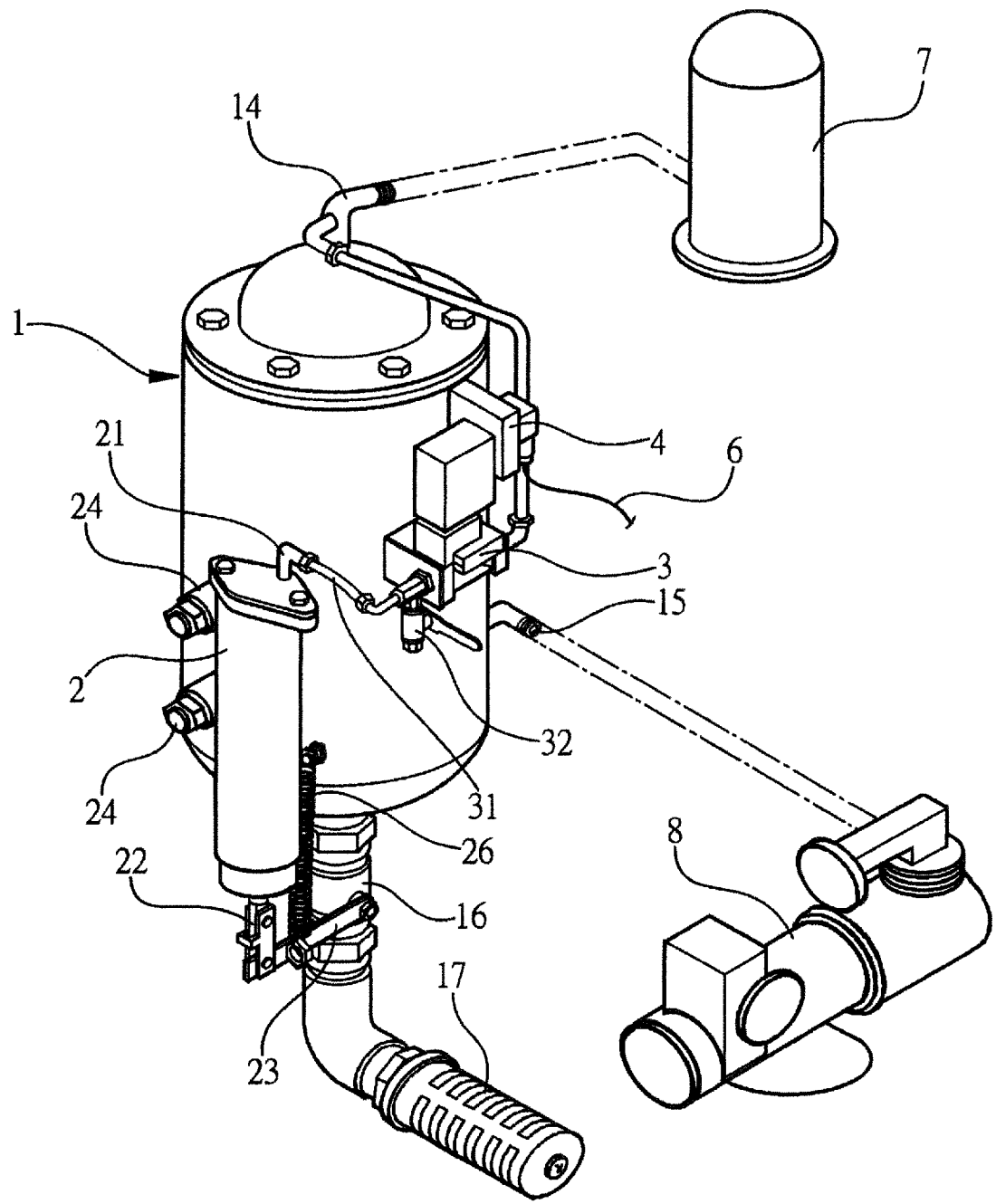
FIG. 3 is a schematic view showing the present invention in an installed state.

Referring to FIG. 3, which is a schematic view showing the present invention in an installed state, as shown in the drawing, the present invention is generally assembled and installed such that the gas outlet opening 14 provided on the top end of the barrel 1 is connected to a gas accumulation tank 7, and the gas inlet opening 15 that is provided at one side of the barrel 1 is connected to an air discharge terminal of an air compressor 8. The air compressor 8 is put into operation to generate compressed air, and when a predetermined time is reached, the compressed air is processed, in the barrel 1, to have water contained therein removed and filtered off, and the compressed air then moves through the gas outlet opening 14 to be accumulated in the gas accumulation tank 7 to supply as pressurized gas for operation of vehicle brakes, horns, or pneumatic tools and devices.

Figure 4:
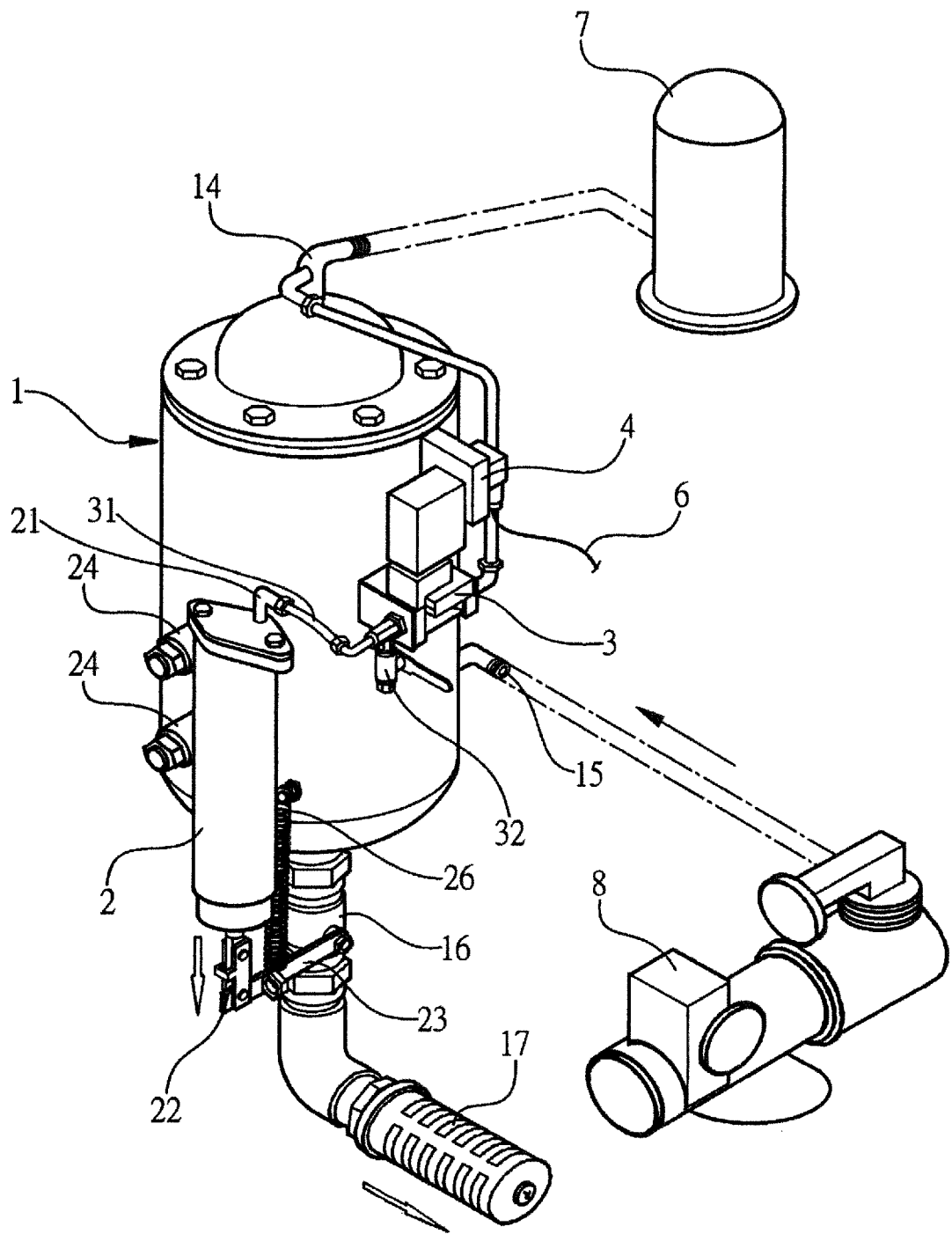
FIG. 4 is a schematic view demonstrating operation of the present invention.

Referring to FIG. 4, which is a schematic view demonstrating operation of the present invention, as shown in the drawing, to use the present invention, the timer 4 is first operated to set a time point or a time schedule (such as a cyclic operation being set to perform at intervals of 10 minutes). When the air compressor 8 is in operation to compress air, compressed air is generated and is guided through the gas inlet opening 15 of the barrel 1 to get into the second chamber 13 and further moving through the division board 11 into the first chamber 12. When the time point set by the timer 4 is reached, the electromagnetic valve 3 is activated and air pressure drives the pneumatic cylinder 2 to make the piston rod 22 of the pneumatic cylinder 2 move (extend), thereby driving the connection rod 23 to rotate by an angle and thus opening the control valve 16 provided on the bottom side of the barrel 1 to release water contained in the compressed air to the outside through the control valve 16. Due to the specific weight of water being greater than that of air, water would settle down and accumulate on the lowest portion of the second chamber 13 of the barrel 1, and in this way, the control valve is allowed to drain off approximately 90% of the water contained in the compressed air. Since the control valve 16 is provided, at an outlet end thereof, with a silencer 17, it is possible to eliminate or reduce noise caused by releasing the water. The connection rod 23 and the barrel 1 are provided a spring 26 arranged therebetween, such that the spring fore of the spring 26 helps return the connection rod 23 to thereby assist restoration and positioning of the pneumatic cylinder 2 and the control valve 16.

Figure 5:
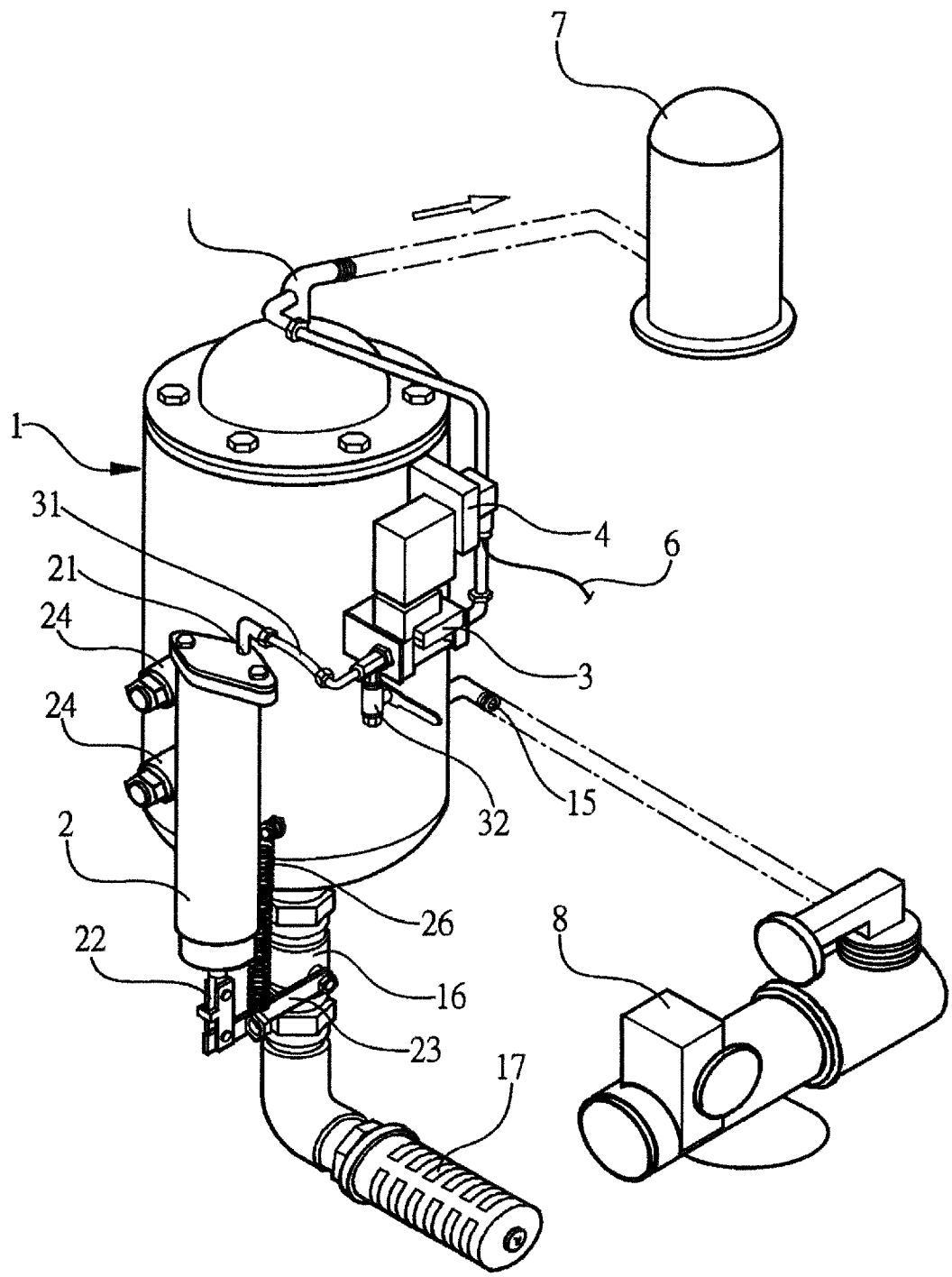
FIG. 5 is another schematic view demonstrating operation of the present invention.

Referring to FIG. 5, which is a schematic view demonstrating operation of the present invention, reference being also had to FIG. 2, as shown in the drawings, the present invention is operated such that when the compressed air generated the air compressor 8 enters the second chamber 13 and the first chamber 12 of the barrel 1, with the electromagnetic valve 3 being activated at intervals or at predetermined time points set by means of the timer 4, the pneumatic cylinder 2 is put into operation to open the control valve 16, and the control valve 16 allows a major portion of the water contained in air to drain off, such that at the time when the compressed air passes through the division board 11 (by way of the through holes 111 formed in the division board 11) to enter the first chamber 12 and is filtered by the desiccant agent 5 disposed in the first chamber 12, a remaining portion of the water would be kept and stored in the desiccant agent 5, and the compressed air so filtered is supplied through the gas outlet opening 14 provided on the top end of the barrel 1 to the gas accumulation tank 7 to accumulate therein for subsequently serving as pressurized gas required for operations of vehicle brakes and pneumatic tools and devices. The desiccant agent 5 that is provided in the first chamber 12 is arranged to be capable of removing the 10% of water that remains after the major portion of water is drained off by the control valve 16, so that there is virtually no water present in the compressed air accumulated in the gas accumulation tank 7.

The present invention is arranged to have the compressed air generated by the air compressor 8 subjected to operations of removal and filtration of water so that the compressed air stored in the gas accumulation tank 7 is virtually free of moisture or water. This invention helps eliminate the necessity of manual intervention of water draining and also help overcome the drawback of electronic parts being suspectable to damage or malfunctioning caused by moisture or water.

The examples described above are provided for illustrating one or more preferred ways of embodying the present invention and are not intended to constrain the scope of the present invention. Modifications and variations that are available through minor change of the disclosure would generally accord to the gist of the present invention and are considered within the scope of the present invention as defined in the appended claims.

In summary, the present invention includes a barrel that is provided with a control valve and a desiccant agent to collaboratively operate with a pneumatic cylinder that is connected by a connection rod to a control valve to form a water handling device for use with an air compressor, which helps remove water from compressed air supplied from the air compressor so as to effectively prevent the water from causing direct or indirect damages to vehicle brakes and pneumatic tools and devices.

We claim:

1. An automatic water handling device of an air compressor, comprising:
   a barrel, which has an interior space in which a division board formed with a plurality of through holes is mounted to define a first chamber and a second chamber, the first chamber receiving a desiccant agent arranged therein, and has a top end that is provided with a gas outlet opening in communication with the first chamber and adapted to connect to a gas accumulation tank, and is provided, at one side thereof, with a gas inlet opening that is in communication with the second chamber and is adapted to connect to an air discharge terminal of an air compressor, and is also provided with a control valve that is arranged at a bottom side of the barrel and in connection with the second chamber;
   a pneumatic cylinder, which arranged at one side of the barrel that is opposite to the gas inlet opening and has a top that is provided with a gas inlet opening, a piston rod being arranged at a bottom side of the pneumatic cylinder and connected to the control valve provided at the bottom side of the barrel by a connection rod;
   an electromagnetic valve, which is in connection with the second chamber of the barrel and is connected by a tube to the gas inlet opening of the pneumatic cylinder; and
   a timer, which is connected to the electromagnetic valve and is operable to set predetermined timing to allow the electromagnetic valve to activate at the predetermined timing, wherein compressed air generated by the air compressor drives the pneumatic cylinder to open the control valve so that a major portion of water contained in the compressed air is drained off, while a minor portion of the water passes through the desiccant agent to enter the gas accumulation tank, thereby achieving a purpose of removing water and effectively protecting vehicle brakes and pneumatic tools and devices from direct or indirect damage caused by the water contained in the compressed air.

2. The automatic water handling device of an air compressor according to claim 1, wherein a spring is arranged between the connection rod and the barrel to provide a spring force that helps returning the connection rod and thus assisting restoration and positioning of the pneumatic cylinder and the control valve.

3. The automatic water handling device of an air compressor according to claim 1, wherein the control valve has an outlet that is provided with a silencer to eliminate noise caused by water draining.

4. The automatic water handling device of an air compressor according to claim 1, wherein the pneumatic cylinder is provided with two support members, and the two support members are mounted to the barrel so as to fix the pneumatic cylinder to the barrel.

* * * * *